United States Patent
Xu et al.

(10) Patent No.: US 8,228,856 B2
(45) Date of Patent: Jul. 24, 2012

(54) NODEB AND METHOD FOR TRANSMITTING CONTROL AND SCHEDULING INFORMATION

(75) Inventors: Tiezhu Xu, Haidian District (CN); Lubang Cheng, Haidian District (CN); Song Wu, Haidian District (CN)

(73) Assignee: China Academy of Telecommunications Technology, Beijing (CN)

( * ) Notice: Subject to any disclaimer, the term of this patent is extended or adjusted under 35 U.S.C. 154(b) by 469 days.

(21) Appl. No.: 12/439,343

(22) PCT Filed: Aug. 29, 2007

(86) PCT No.: PCT/CN2007/070579
§ 371 (c)(1),
(2), (4) Date: Sep. 21, 2009

(87) PCT Pub. No.: WO2008/031354
PCT Pub. Date: Mar. 20, 2008

(65) Prior Publication Data
US 2010/0014469 A1    Jan. 21, 2010

(30) Foreign Application Priority Data
Sep. 1, 2006    (CN) .......................... 2006 1 0112796

(51) Int. Cl.
*H04W 4/00* (2009.01)
*H04J 3/00* (2006.01)
(52) U.S. Cl. ........................................ 370/329; 370/336
(58) Field of Classification Search .................. None
See application file for complete search history.

(56) References Cited

U.S. PATENT DOCUMENTS

| | | | | |
|---|---|---|---|---|
| 2002/0150058 A1* | 10/2002 | Kim et al. | ...................... | 370/280 |
| 2007/0019644 A1* | 1/2007 | Lee | ................................ | 370/389 |
| 2007/0086381 A1* | 4/2007 | Lee et al. | ...................... | 370/331 |
| 2009/0245197 A1* | 10/2009 | Ma et al. | ....................... | 370/330 |

FOREIGN PATENT DOCUMENTS

| | | |
|---|---|---|
| CN | 1466286 A | 1/2004 |
| CN | 1627835 A | 6/2005 |
| CN | 1863355 A | 11/2006 |
| JP | 2002-335557 A | 11/2002 |
| WO | WO 2006/046307 A1 | 5/2006 |

OTHER PUBLICATIONS

NEC Group, "Physical channel mapping for uni-cast", TSG-RAN WG1 LTE Ad hoc R1-060056, 2006.
CATT, RITT, TD-Tech, ZTE, Huawei, "Frame structure design and analyze of OFDM TDD for LTE", 3GPP TSG RAN WG1#42bis R1-051178, 2005.
Japanese Office Action for corresponding Japanese Patent Application No. 2009-525903 dated Oct. 4, 2011.

* cited by examiner

*Primary Examiner* — John Blanton
(74) *Attorney, Agent, or Firm* — Merchant & Gould P.C.

(57) ABSTRACT

The present invention discloses a method for transmitting control and scheduling information. The method comprises an eNodeB transmitting control and scheduling information unable to be beamformed in a DwPTS. The control and scheduling information unable to be beamformed is switched from the downlink service slot to the DwPTS and then transmitted, so that the efficiency of time and frequency transmission is improved, the design complexity of the transmitter is reduced, the capacity of the radio access system may be improved and the design of the receiver may be simplified. The present invention also discloses a NodeB.

7 Claims, 4 Drawing Sheets

NODEB AND METHOD FOR TRANSMITTING CONTROL AND SCHEDULING INFORMATION

This application is a National Stage Application of PCT/CN2007/070579, filed Aug. 29, 2007, which claims benefit of Serial No. 200610112796.5, filed Sep. 1, 2006 in China and which applications are incorporated herein by reference. To the extent appropriate, a claim of priority is made to each of the above disclosed applications.

FIELD OF THE INVENTION

The present invention relates to the mobile communication field, and more particularly to a NodeB and a method for transmitting control and scheduling information for the NodeB.

BACKGROUND OF THE INVENTION

In the conventional communication system, a terminal receiver receives control and scheduling information transmitted from a NodeB before performing data demodulation, wherein the control and scheduling information is used for notifying the terminal receiver of operations to be taken, such as the information of the physical channel where downlink resources locate and coding mode, so that the terminal receiver may know in advance the scheduling information needed for receiving data, such as parameters of resource assignment and valid duration of signaling block.

In an OFDM (Orthogonal Frequency Division Multiplexing) system, since methods for allocating resources are flexible and the minimum TTI (Transmission Time Interval) required by the OFDM system is one subframe, i.e. transmission parameters vary in a very short period, currently in the OFDM system all the scheduling information and service data are transmitted together with a scheduled resource block in a same TTI.

Currently when an eNodeB (evolved NodeB) is transmitting control signaling, a large amount of control signaling and service data are together transmitted to a UE (User Equipment). However, in the large amount of control and scheduling information, some of it is to be received by the UE before the UE receives the data and only when this part of information is obtained can the UE read its own data from a corresponding downlink resource block. The terminal receiver needs to receive this part of information before demodulating the data. However, the terminal receiver cannot rely on a direction of receiving beams from the user and make the strongest end of a transmitting beam aligned with this direction by using the digital signal processing technique, i.e. this part of information cannot be beamformed.

In the current OFDM-TDD (Orthogonal Frequency Division Multiplexing-Time Division Duplex) system, the control and scheduling information is transmitted together with the service data in a downlink service slot, wherein the control and scheduling information is typically downlink control and scheduling information.

The downlink control and scheduling information includes the first type control and scheduling information, the second type control and scheduling information and the third type control and scheduling information. The first type control and scheduling information includes UE identity, resource assignment mode and valid duration of a signaling block. The second type control and scheduling information includes information of antenna, modulation mode and payload size. The third type control and scheduling information includes process number, redundancy version, new data indicator etc. of a hybrid automatic repeat need to be transmitted when an asynchronous hybrid automatic repeat mechanism is adopted; sequence number of the repeated data need to be transmitted when an asynchronous hybrid automatic repeat mechanism is adopted. The first type control and scheduling information cannot be beamformed and needs to be received by the UE before the UE receives downlink data. The second and third type control and scheduling information is UE-dedicated control and scheduling information and can be beamformed.

FIG. 1 is a schematic diagram showing a frame structure of transmitting the service data and the control and scheduling information together in the downlink service slot according to the prior art. In FIG. 1, R1 represents the first reference symbol, R2 represents the second reference symbol, D represents the service data, C1 represents the first type control and scheduling information, C2 represents the second type control and scheduling information and C3 represents the third type control and scheduling information.

The service data and the second and third type control and scheduling information need to be beamformed and the first type control and scheduling information unable to be beamformed needs to be transmitted together with the service data and the second and third type control and scheduling information in the same subframe, thus it becomes more difficult for the transmitter to process. Since the UE needs to receive the first type control and scheduling information in advance, if the first type control and scheduling information is transmitted together with the service data in the same subframe and the first type control and scheduling information is located at the foremost end of the subframe, the receiver needs to accomplish the demodulation and decoding of the first type control and scheduling information in a very short period so as to extract the scheduling information of the service data, thus it puts higher requirements for the receiver. Even the receiver adopts a method for receiving all the resources and may guarantee no data will be lost, it will increase the processing complexity of the receiver greatly and is not in favor of the design of the UE.

FIG. 2 is a schematic diagram showing an OFDM-TDD subframe according to the prior art. In FIG. 2, TS1-TS6 represent service slots, TS0 represents a downlink broadcast slot, DwPTS represents a downlink pilot slot, GP represents a guard period and UpPTS represents an uplink pilot slot. Currently, in the OFDM-TDD subframe structure, the DwPTS only carries the downlink pilot information and some frequency resources are not utilized except for a 1.25 MHz bandwidth occupied by the downlink pilot information. The amount of available resources depends on how many resources of the cell bandwidth are occupied: the more the cell bandwidth is, the more the available resources are, and thus resources are wasted and the efficiency of time and frequency transmission is reduced.

Therefore, according to the prior art, the control and scheduling information unable to be beamformed is transmitted in the downlink service slot and it increases the processing complexity of the transmitter and puts higher requirements for the receiver.

In addition, according to the prior art, only the downlink pilot information is transmitted in the DwPTS and some frequency resources are wasted so the efficiency of time and frequency transmission is reduced.

SUMMARY OF THE INVENTION

An objective of the present invention is to provide a NodeB and a method for transmitting control and scheduling information thereof so as to solve the problem of prior art of increasing difficulty in designing a transmitter when control and scheduling information is transmitted in a downlink service slot.

The method according to the present invention comprises: transmitting in the DwPTS by an eNodeB the control and scheduling information unable to be beamformed.

When the eNodeB's cell bandwidth is larger than a bandwidth occupied by downlink pilot information, the eNodeB transmits the control and scheduling information in the interframe or every-frame mode; and when the eNodeB's cell bandwidth is equal to the bandwidth occupied by the downlink pilot information, the eNodeB transmits the control and scheduling information in the interframe mode.

An interval of interframe transmission is one frame or several frames.

If a subframe has the downlink pilot information, the eNodeB multiplies the control and scheduling information and the downlink pilot information in a same DwPTS on the subframe and then transmitting them; and if a subframe has no downlink pilot information, the eNodeB maps the control and scheduling information to a whole DwPTS on the subframe and then transmits it.

When the eNodeB's cell bandwidth is larger than a bandwidth occupied by downlink pilot information, the eNodeB transmits the control and scheduling information with frequency resources that remain in the DwPTS after the downlink pilot information is transmitted in the DwPTS, or transmits the control and scheduling information with all the frequency resources of the DwPTS.

The present invention provides a NodeB, which comprises a transmitting module for transmitting control and scheduling information unable to be beamformed to a UE.

When the NodeB's cell bandwidth is larger than a bandwidth occupied by downlink pilot information, the NodeB transmits the control and scheduling information in the interframe or every-frame mode; and when the NodeB's cell bandwidth is equal to the bandwidth occupied by the downlink pilot information, the NodeB transmits the control and scheduling information in the interframe mode.

If a subframe has the downlink pilot information, the NodeB multiplies the control and scheduling information and the downlink pilot information in a same DwPTS on the subframe and then transmitting them; and if a subframe has no downlink pilot information, the NodeB maps the control and scheduling information to a whole DwPTS on the subframe and then transmitting it.

When the NodeB's cell bandwidth is larger than a bandwidth occupied by downlink pilot information, the NodeB transmits the control and scheduling information with frequency resources that remain in the DwPTS after the downlink pilot information is transmitted in the DwPTS, or transmits the control and scheduling information with all the frequency resources of the DwPTS.

Advantageous effects of the present invention are that: the control and scheduling information unable to be beamformed is switched from the downlink service slot to the DwPTS and then transmitted, so that some available frequency resources in the DwPTS are utilized and further the efficiency of time-and-frequency transmission is improved, the design complexity of the transmitter is reduced, the capacity of the radio access system may be improved and the design of the receiver may be simplified.

DETAILED DESCRIPTION OF THE DRAWINGS

Detailed description of the present invention will be given with reference to accompanied drawings.

In the present invention, since control and scheduling information unable to be beamformed is transmitted in a DwPTS and some available frequency resources in the DwPTS are utilized so that the efficiency of time-and-frequency transmission is improved; and since the control and scheduling information is separated from the downlink service slot and is not transmitted in the downlink service slot, the design complexity of the transmitter is reduced, the capacity of the radio access system may be improved and the design of the receiver may be simplified.

Three basic solutions of the present invention are described below.

Solution 1: when the eNodeB's cell bandwidth is larger than a bandwidth of 1.25 MHz occupied by downlink pilot information, the eNode adopts an interframe transmission mode of the downlink pilot information, and on a subframe having the downlink pilot information, the eNodeB multiplies the control and scheduling information and the downlink pilot information in a same DwPTS on the subframe and then transmits them, and on a subframe having no downlink pilot information, the eNodeB maps the control and scheduling information to a whole DwPTS on the subframe and then transmits it;

Solution 2: when the eNodeB's cell bandwidth is larger than a bandwidth of 1.25 MHz occupied by downlink pilot information, the eNodeB multiplies the control and scheduling information to a same DwPTS with the downlink pilot information and then transmits them on every frame at the same time according to an every-frame transmission mode of the downlink pilot information;

Solution 3: when the eNodeB's cell bandwidth is equal to a bandwidth of 1.25 MHz occupied by downlink pilot information, if a subframe has no downlink pilot information, the eNodeB maps the control and scheduling information to a whole DwPTS bandwidth resources on the subframe and then transmits it according to an interframe transmission mode of the downlink pilot information.

Figure 1:
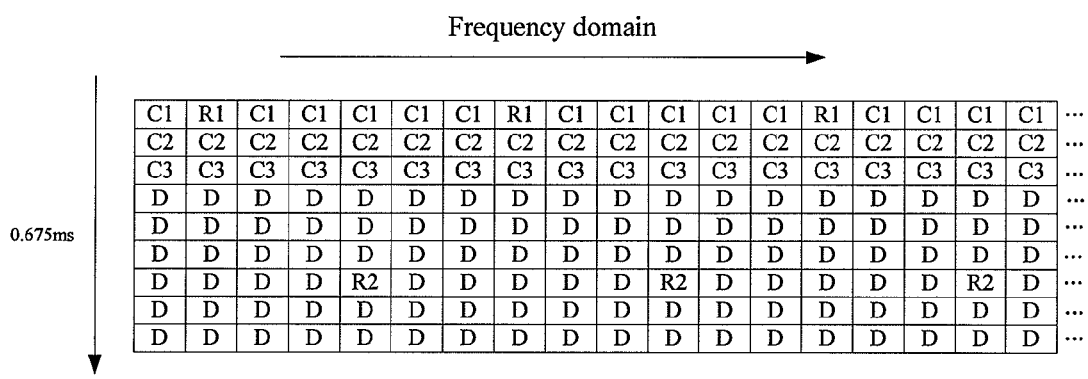
FIG. 1 is a schematic diagram showing a frame structure of transmitting service data and control and scheduling information together in a downlink service slot according to the prior art.
Figure 2:
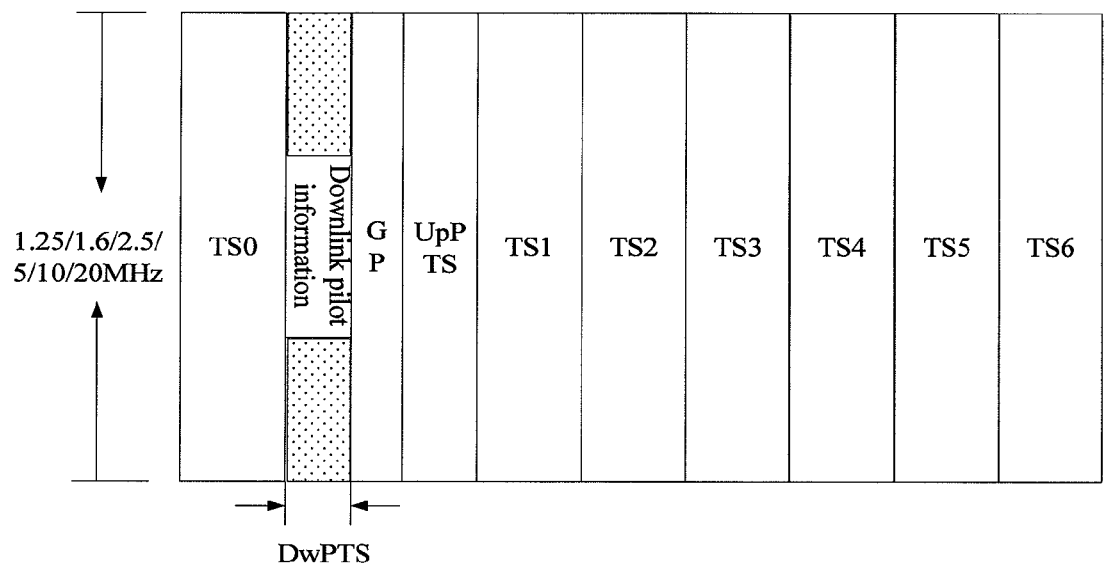
FIG. 2 is a schematic diagram showing an OFDM-TDD subframe according to the prior art.
Figures 3, 4:
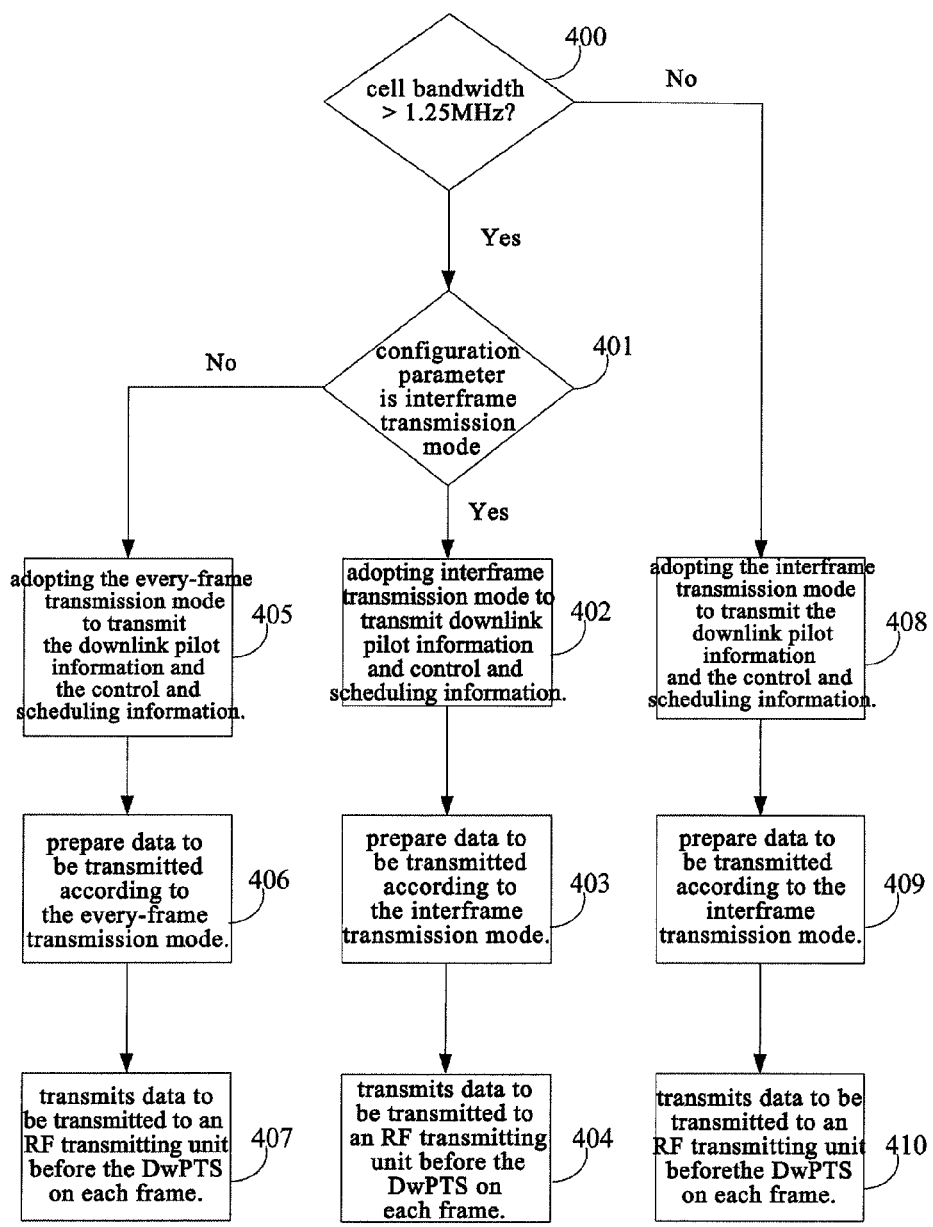
FIG. 3 is a schematic diagram showing a connection of a NodeB.
FIG. 4 is a schematic diagram showing an overall flow of realizing a method of the present invention.

FIG. 3 is a schematic diagram showing a connection of a NodeB. As shown in the figure, the eNodeB is connected with a UE and the eNodeB is for transmitting the control and scheduling information to the UE in a DwPTS.

FIG. 4 is a schematic diagram showing an overall flow of realizing a method of the present invention. The control and scheduling information of the present invention refers to the control and scheduling information unable to be beamformed.

As shown in the figure, the method of the present invention generally includes following steps.

In step 400, the eNodeB examines whether the eNodeB's cell bandwidth is larger than 1.25 MHz, and if yes, step 401 is performed; otherwise step 408 is performed.

In step 401, a control platform configures a transmission mode of the downlink pilot information and if it is the interframe transmission, step 402 is performed; otherwise step 405 is performed.

The control platform configures the transmission mode of the downlink pilot information and the eNodeB selects the same transmission mode to transmit the downlink pilot information.

In step 402, the eNodeB multiplies and maps the control and scheduling information to the DwPTS.

If the subframe has the downlink pilot information, the eNodeB multiplies the control and scheduling information to a different subcarrier resource which belongs to the same bandwidth resources with the downlink pilot information;

if the subframe has no downlink pilot information, the eNodeB maps the control and scheduling information to the whole bandwidth resources of the DwPTS on the subframe.

In step 403, the eNodeB prepares data to be transmitted according to the interframe transmission mode.

The eNodeB prepares the data according to the information to be transmitted: if the downlink pilot information and the control and scheduling information are to be transmitted, the prepared data are the downlink pilot information and the control and scheduling information; if the control and scheduling information is to be transmitted, the prepared data are the control and scheduling information.

In step 404, the eNodeB transmits data to be transmitted to an RF transmitting unit before the DwPTS on each frame to be transmitted and then the RF transmitting unit performs the transmission by using a frequency mapping mode.

In step 405, the eNode B multiplies the control and scheduling information to the DwPTS.

On the subframe which has the downlink pilot information, the eNodeB multiplies the control and scheduling information to a different subcarrier resource which belongs to the same bandwidth resources of the downlink pilot information.

In step 406, the eNodeB prepares data to be transmitted according to the every-frame transmission mode.

The eNodeB prepares data of the downlink pilot information and of the control and scheduling information at the same time according to the every-frame transmission mode.

In step 407, the eNodeB transmits data to be transmitted to an RF transmitting unit before the DwPTS on each frame to be transmitted and then the RF transmitting unit performs the transmission by using a frequency mapping mode.

In step 408, the eNode B maps the control and scheduling information to the DwPTS without the downlink pilot information.

In step 409, the eNodeB prepares data to be transmitted according to the interframe transmission mode.

The eNodeB prepares the data according to the information to be transmitted: if the downlink pilot information is to be transmitted, the prepared data are the downlink pilot information; if the control and scheduling information is to be transmitted, the prepared data are the control and scheduling information.

In step 410, the eNodeB transmits data to be transmitted to an RF transmitting unit before the DwPTS on each frame to be transmitted and then the RF transmitting unit performs the transmission by using a frequency mapping mode.

Figure 5A:
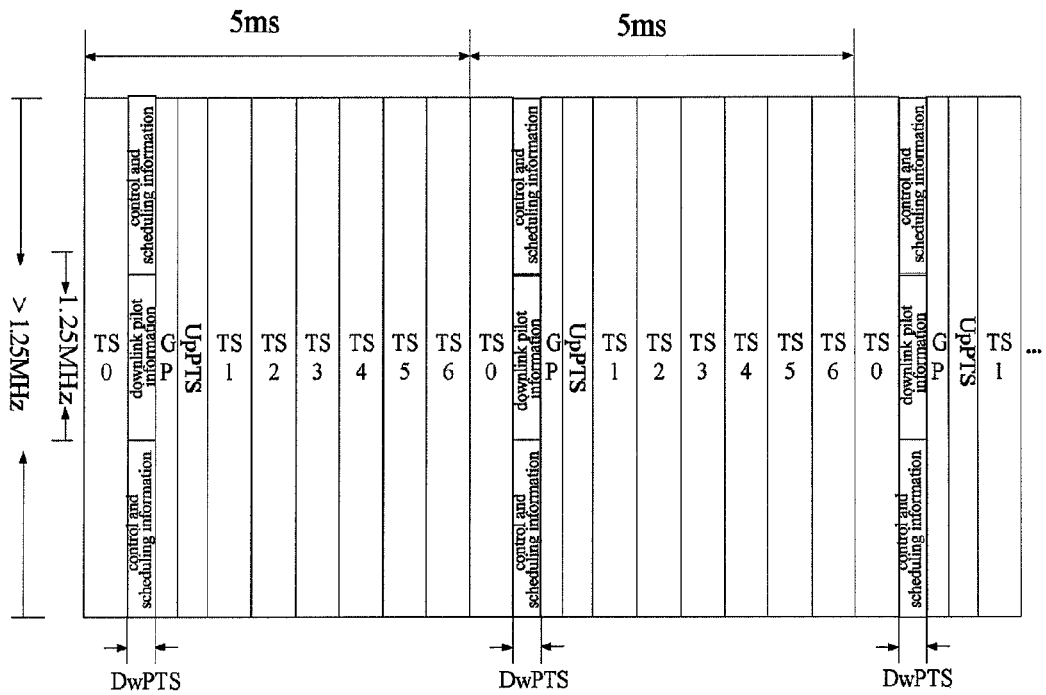
FIGS. 5A, 5B and 5C show OFDM-TDD subframe structures in three cases of transmitting the control and scheduling information and the downlink pilot information.

FIG. 5A shows an OFDM-TDD subframe structure of the every-frame transmission mode when the eNodeB's cell bandwidth is larger than 1.25 MHz.

According to the figure, the eNodeB's cell bandwidth is larger than 1.25 MHz, the every-frame transmission mode is adopted, the control and scheduling information is multiplied to the DwPTS, the downlink pilot information occupies 1.25 MHz bandwidth and the remaining bandwidth resources are occupied by the control and scheduling information.

The time for the eNodeB to transmit the OFDM-TDD subframe is 5 ms and every frame of the downlink pilot information and the control and scheduling information is transmitted at the same time.

Figure 5B:
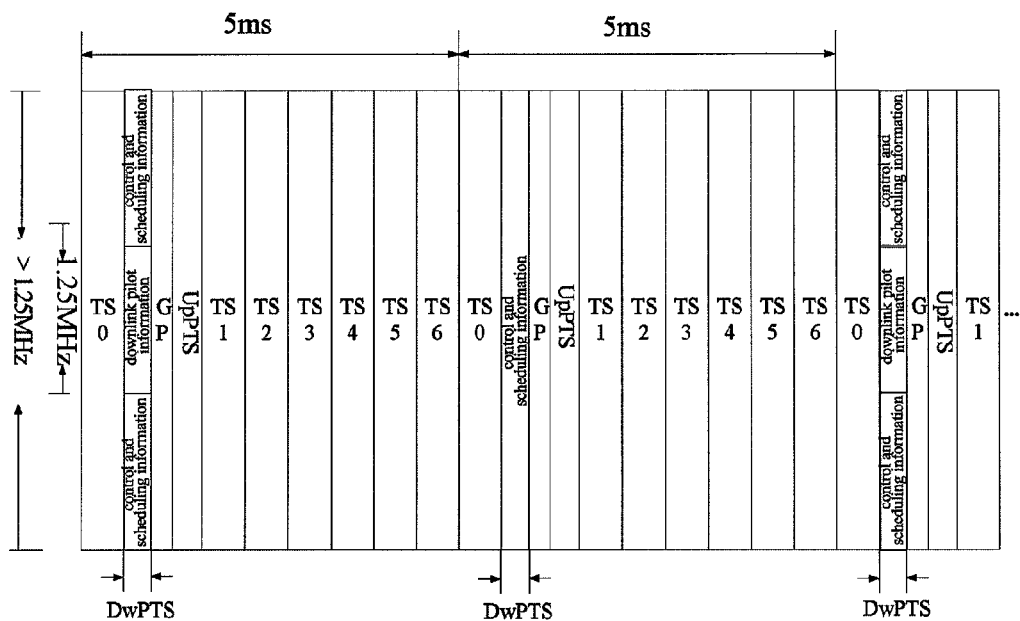

FIG. 5B shows an OFDM-TDD subframe structure of the interframe transmission mode when the eNodeB's cell bandwidth is larger than 1.25 MHz.

According to the figure, the eNodeB's cell bandwidth is larger than 1.25 MHz, the interframe transmission mode is adopted, the control and scheduling information is multiplied to the DwPTS on the subframe which has the downlink pilot information and occupies the remaining bandwidth resources; the control and scheduling information is multiplied to the whole bandwidth resources of the DwPTS on the subframe which has no downlink pilot information.

The time for the eNodeB to transmit the OFDM-TDD subframe is 5 ms and the interval of the interframe transmission may be one frame or several frames.

Figure 5C:
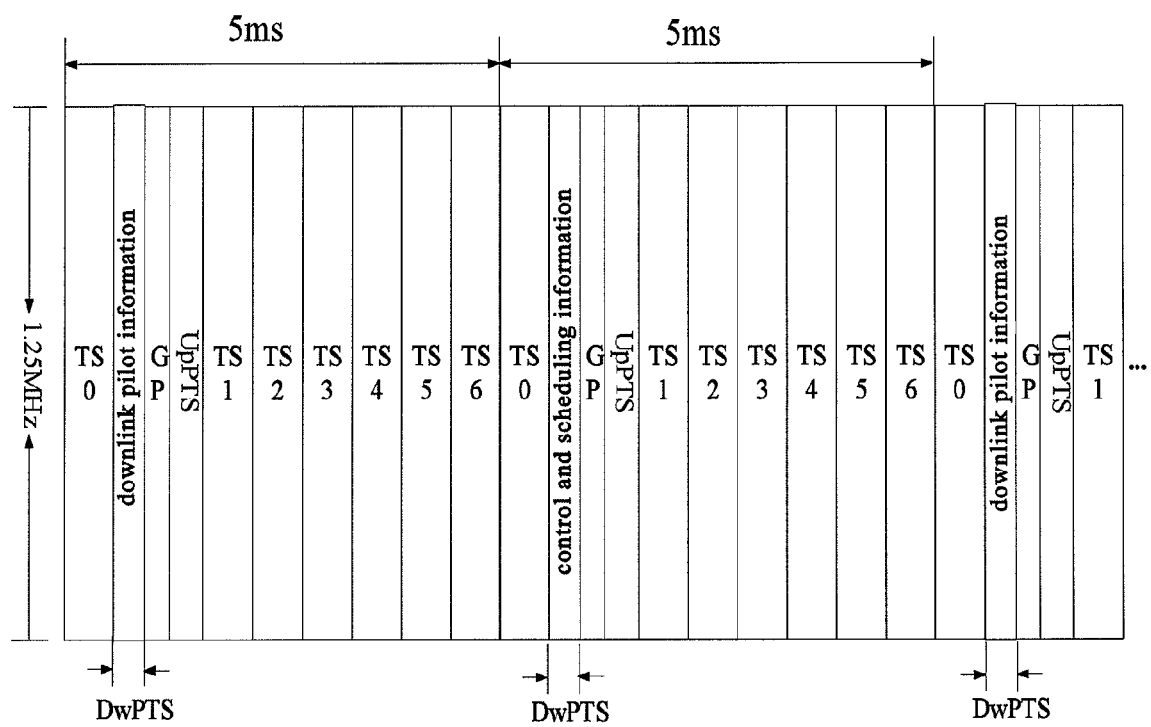

FIG. 5C shows an OFDM-TDD subframe structure of the interframe transmission mode when the eNodeB's cell bandwidth is equal to 1.25 MHz.

According to the figure, the eNodeB's cell bandwidth is equal to 1.25 MHz, the control and scheduling information is multiplied to the whole bandwidth resources of the DwPTS if the subframe has no downlink pilot information.

The time for the eNodeB to transmit the OFDM-TDD subframe is 5 ms and the interval of the interframe transmission may be one frame or several frames.

Obviously, those skilled in the art may make different changes and modifications to the present invention without departing from the teachings of the present invention. Thus if these changes and modifications fall into the scope of the claims and their equivalents, the present invention intends to include these changes and modifications.

The invention claimed is:

1. A method for transmitting control and scheduling information, comprising:
   transmitting in the DwPTS by an eNodeB the control and scheduling information unable to be beamformed,
   wherein if a subframe has downlink pilot information, the eNodeB multiplies the control and scheduling information and the downlink pilot information in a same DwPTS on the subframe and then transmits the resulting information using the remaining bandwidth resources of the DwPTS, and
   if a subframe has no downlink pilot information, the eNodeB maps the control and scheduling information to the whole DwPTS on the subframe and then transmits the resulting information using the whole bandwidth resources of the DwPTS.

2. The method according to claim 1, wherein
   when the eNodeB's cell bandwidth is larger than a bandwidth occupied by downlink pilot information, the eNodeB transmits the control and scheduling information in an interframe or every-frame mode; and
   when the eNodeB's cell bandwidth is equal to the bandwidth occupied by the downlink pilot information, the eNodeB transmits the control and scheduling information in the interframe mode.

3. The method according to claim 2, wherein an interval of the interframe mode transmission is one frame or several frames.

4. The method according to claim 2, wherein when the eNodeB's cell bandwidth is larger than a bandwidth occupied by downlink pilot information, the eNodeB transmits the control and scheduling information with frequency resources that remain in the DwPTS after the downlink pilot information is transmitted in the DwPTS, or the eNodeB transmits the control and scheduling information with all the frequency resources of the DwPTS.

5. A NodeB, comprising
- a transmitting module, for transmitting control and scheduling information unable to be beamformed to a UE,
- wherein if a subframe has downlink pilot information, the eNodeB multiplies the control and scheduling information and the downlink pilot information in a same DwPTS on the subframe and then transmits the resulting information using the remaining bandwidth resources of the DwPTS, and
- if a subframe has no downlink pilot information, the eNodeB maps the control and scheduling information to the whole DwPTS on the subframe and then transmits the resulting information using the whole bandwidth resources of the DwPTS.

6. The NodeB according to claim 5, wherein
- when the NodeB's cell bandwidth is larger than a bandwidth occupied by downlink pilot information, the NodeB transmits the control and scheduling information in the interframe or every-frame mode; and
- when the NodeB's cell bandwidth is equal to the bandwidth occupied by the downlink pilot information, the NodeB transmits the control and scheduling information in the interframe mode.

7. The NodeB according to claim 6, wherein when the NodeB's cell bandwidth is larger than a bandwidth occupied by downlink pilot information, the NodeB transmits the control and scheduling information with frequency resources that remain in the DwPTS after the downlink pilot information is transmitted in the DwPTS, or the NodeB transmits the control and scheduling information with all the frequency resources of the DwPTS.

* * * * *